(12) United States Patent
Malegaonkar et al.

(10) Patent No.: US 8,902,274 B2
(45) Date of Patent: Dec. 2, 2014

(54) SYSTEM AND METHOD FOR DISTRIBUTING MEETING RECORDINGS IN A NETWORK ENVIRONMENT

(71) Applicants: Ashutosh A. Malegaonkar, Milpitas, CA (US); Paul Quinn, San Francisco, CA (US); Sachin Kajarekar, Sunnyvale, CA (US)

(72) Inventors: Ashutosh A. Malegaonkar, Milpitas, CA (US); Paul Quinn, San Francisco, CA (US); Sachin Kajarekar, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 113 days.

(21) Appl. No.: 13/693,848

(22) Filed: Dec. 4, 2012

(65) Prior Publication Data
US 2014/0152757 A1    Jun. 5, 2014

(51) Int. Cl.
H04N 7/14    (2006.01)

(52) U.S. Cl.
CPC .................................... *H04N 7/147* (2013.01)
USPC .................. 348/14.01; 340/573.1; 348/14.03; 348/14.07; 348/14.08; 379/202.01; 702/186; 705/1.1; 707/667; 709/203; 709/204; 709/206; 715/704; 715/753; 715/764

(58) Field of Classification Search
CPC . H04L 41/5003; H04M 3/2281; H04M 7/006
USPC ..................... 348/14.01, 14.03, 14.07, 14.08; 379/202.01; 707/667; 709/206, 203, 709/204; 715/764, 704, 753; 340/573.1; 702/186; 705/1.1
See application file for complete search history.

(56) References Cited

U.S. PATENT DOCUMENTS

| | | | |
|---|---|---|---|
| 5,559,875 A | 9/1996 | Bieselin et al. | |
| 5,668,863 A | 9/1997 | Bieselin et al. | |
| 6,119,147 A * | 9/2000 | Toomey et al. | 709/204 |
| 7,379,848 B2 * | 5/2008 | Yu et al. | 702/186 |
| 7,454,460 B2 * | 11/2008 | Ivashin | 709/203 |
| 7,590,230 B1 * | 9/2009 | Surazski | 379/202.01 |
| 7,660,851 B2 | 2/2010 | Manion et al. | |
| 7,679,518 B1 * | 3/2010 | Pabla et al. | 340/573.1 |
| 8,111,282 B2 * | 2/2012 | Cutler et al. | 348/14.01 |
| 8,204,759 B2 * | 6/2012 | Ashour et al. | 705/1.1 |
| 8,310,519 B2 * | 11/2012 | Valenzuela et al. | 348/14.08 |
| 8,365,075 B2 * | 1/2013 | Bhogal et al. | 715/704 |
| 8,667,401 B1 * | 3/2014 | Lozben | 715/753 |
| 8,698,872 B2 * | 4/2014 | Begeja et al. | 348/14.08 |
| 2009/0210491 A1 | 8/2009 | Thakkar et al. | |
| 2011/0113357 A1 * | 5/2011 | Rosu et al. | 715/764 |
| 2012/0154510 A1 * | 6/2012 | Huitema et al. | 348/14.03 |
| 2012/0323856 A1 * | 12/2012 | Artishdad et al. | 707/667 |
| 2013/0007175 A1 * | 1/2013 | Travis et al. | 709/206 |
| 2013/0063542 A1 * | 3/2013 | Bhat et al. | 348/14.03 |
| 2013/0070045 A1 * | 3/2013 | Meek | 348/14.07 |
| 2014/0152757 A1 * | 6/2014 | Malegaonkar et al. | 348/14.01 |

* cited by examiner

*Primary Examiner* — Gerald Gauthier
(74) *Attorney, Agent, or Firm* — Patent Capital Group

(57) ABSTRACT

A method is provided and includes discovering active participants and passive participants from a meeting recording, generating an active notification that includes an option to manipulate the meeting recording, and a passive notification without the option to manipulate the meeting recording, and sending the active notification and the passive notification to the active participants and the passive participants, respectively. The method can also include discovering followers from the meeting recording, generating a followers notification without the option to manipulate the meeting recording, and which includes access to a portion of meeting recording, and sending the followers notification to the followers. Discovering the active participants and the passive participants includes running speaker segmentation and recognition algorithms on the meeting recording, discovering attendees including speakers and non-speakers, and categorizing the speakers as the active participants, and the non-speakers as the passive participants.

20 Claims, 5 Drawing Sheets

SYSTEM AND METHOD FOR DISTRIBUTING MEETING RECORDINGS IN A NETWORK ENVIRONMENT

TECHNICAL FIELD

This disclosure relates in general to the field of media content analytics and, more particularly, to a system and a method for distributing meeting recordings in a network environment.

BACKGROUND

The ability to effectively gather, associate, and organize information presents a significant obstacle for component manufacturers, system designers, and network operators. As new media content analytics platforms and technologies become available, new protocols should be developed in order to optimize the use of these emerging platforms. With the emergence of high-bandwidth networks and devices, enterprises can optimize global collaboration through creation of videos, and personalization of connections between customers, partners, employees, and students through recordings of organizational communications, video conferences, and training sessions, as well as through user-generated video content. Widespread use of video and audio drives advances in technology for video/audio processing, video creation, uploading, searching, and viewing.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method for distributing meeting recordings in a network environment is provided and includes discovering (e.g., identifying, detecting, recognizing, ascertaining, evaluating, processing information to find, etc.) active participants and passive participants from a meeting recording. The method could also include generating an active notification that includes an option to manipulate the meeting recording, and a passive notification without the option to manipulate the meeting recording, and sending the active notification and the passive notification to the active participants and the passive participants, respectively. Discovering the active participants and the passive participants could include, for example, running speaker segmentation and recognition algorithms on the meeting recording, discovering attendees including speakers and non-speakers, and categorizing the speakers as the active participants, and the non-speakers as the passive participants.

Discovering the active and passive participants can also include comparing the discovered speakers to speaker models from pre-recording videos, and suggesting names of potential speakers if a match between the discovered speakers and the speaker models is below a predetermined threshold. The discovered speakers may be reconciled with an invitee list to generate an attendee list, and the method may further include determining if substantially all attendees in the attendee list spoke in the meeting recording, and determining the passive participants as those attendees who did not speak. In specific embodiments, the active and passive notifications include a provision to access and view the meeting recording.

In specific implementations, the method could also include discovering followers from the meeting recording, generating a followers notification without the option to manipulate the meeting recording, and which includes access to a portion of meeting recording, and sending the followers notification to the followers. Discovering the followers can include running automatic speech recognition and named entity extraction algorithms on the meeting recording, discovering spoken names in the meeting recording, and associating the followers with a portion of the spoken names not corresponding to attendees in the meeting recording.

Example Embodiments

Figure 1:
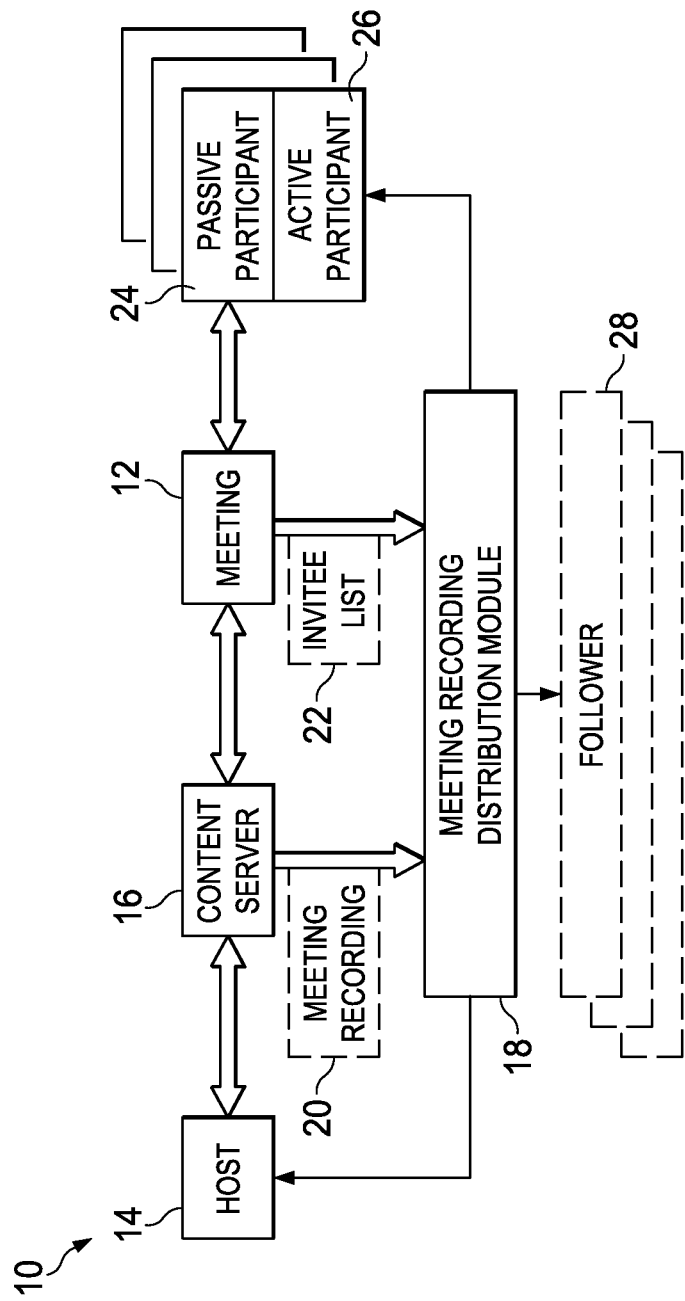
FIG. 1 is a simplified block diagram illustrating a communication system configured for distributing meeting recordings in a network environment according to an example embodiment.

Turning to FIG. 1, FIG. 1 is a simplified block diagram illustrating a communication system 10 for distributing meeting recordings in a network environment in accordance with one example embodiment. Communication system 10 includes a meeting 12 conducted by (e.g., hosted by) a host 14. Meeting 12 may be recorded onto a content server 16. A meeting recording distribution module 18 may access a meeting recording 20 from content server 16 and an invitee list 22 of meeting 12. Meeting recording distribution module 18 may generate notifications associated with meeting recording 20 to active participants 24, passive participants 26, and followers 28.

Certain terminologies are used with regard to the various embodiments of communication system 10. As used herein, the term "meeting" is inclusive of conferences or conventions where attendees (e.g., people who attend the meeting in person, or virtually) can participate (e.g., present, speak, etc.). This could include training sessions and events, where a few attendees can speak, and many attendees merely listen. Meeting 12 may be a teleconference, a video conference, a classroom, an event center, a training center, a chat room, a discussion, a seminar, a business meeting, an assembly, a get-together, a gathering, etc. where a plurality of attendees can congregate (either physically or virtually) and discuss topics of interest. Meeting 12 may be virtual (e.g., occurring in a virtual space, such as the Internet, cloud networks, etc.), or real (e.g., occurring in an indoor or outdoor physical space, such as in a school, stadium, park, conference center, etc.).

As used herein, the term "active participant" refers to any attendee who speaks audibly at meeting 12. For example, presenters, panelists, teachers, etc. may be active participants.

The term "passive participant" refers to any attendee who does not speak audibly at meeting 12 or who was invited to, but did not attend, meeting 12. For example, an attendee who does not make any presentation, a silent student in a classroom, an absent student, etc. may be passive participants. The term "follower" refers to any person whose name is mentioned at meeting 12, but does not attend meeting 12. The term "host" refers to any person (e.g., network administrator, attendee), application, or network element that initiates meeting 12, sends out invitations to prospective meeting participants, facilitates recording of meeting 12, and in general controls or guides meeting 12.

As used herein, an "application" can be inclusive of an executable file comprising instructions that can be understood and processed on a computer. This could include library modules loaded during execution, object files, system files, hardware logic, software logic, or any other executable modules. As used herein, the term "network element" is meant to encompass network appliances, servers, routers, switches, gateways, bridges, load balancers, firewalls, processors, modules, or any other suitable device, proprietary component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

As used herein, the term "meeting recording" can include captured screen shots, video or audio recordings of meeting 12. In general, captured screen shots may include video, without accompanying audio; video recordings may include video and accompanying audio; and audio recordings may include audio only, without accompanying video. The meeting recording may be in a digital file format, for example, according to the particular software used to run meeting 12. For example, a CiscoWebEx meeting recording may be in *.arf format or *.wrf format; a Citrix GoTo meeting recording may be in GoToMeeting codec format; Microsoft LiveMeeting meeting recording may be in *.wma format; etc. Any suitable file format may be used for recording meeting 12 within the broad scope of the embodiments.

For purposes of illustrating the techniques of communication system 10, it is important to understand the communications in a given system such as the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Business meetings, conferences, and such other meetings are increasingly being recorded. The meeting recordings can be distributed across an enterprise (or other network) via a video portal (e.g., YouTube). Typically, a recorded video is uploaded to the portal using administrative privileges and in the process, information about the attendees can be lost. For example, information such as names of presenters, topics discussed etc. may not be captured in metadata of the meeting recording.

In some cases, the host may merely facilitate the technological aspects of the meeting (e.g., setting up an online meeting center, uploading the meeting recording to the portal, etc.), but may not be actively engaged in the meeting. For example, the host may not be in the best position to know topics discussed at the meeting, who should receive the meeting recording, etc. However, the onus of distributing the meeting recording to the participants may typically fall on the host. As a result, in many cases, the meeting recording may not be distributed to the attendees for their consumption.

For example, consider a business meeting associated with a staff meeting. The host may be the company's information technology specialist, who may not be interested in, or even present at, the meeting. The host may set up a camcorder to record the meeting, get a telephone conference line connected, start an online conference center, etc., to facilitate the meeting. The attendees may include the department head, a secretary, and staff members. Each attendee may have varied interests in consuming the meeting recording. In general, the interest may be directly proportional to the attendee's level of participation in the meeting.

For example, the secretary may be interested in viewing the meeting recording later to generate minutes of the meeting; the department head may be interested in the meeting recording to recapture the ideas that were discussed at the meeting. The department head may have spoken during the meeting, and may be interested in adding metadata to the meeting recording to enhance consumption and search of the video appropriately. The host may not be aware of such varied interests. In some cases, the host may not even be aware of the attendee list. The host may generate a meeting recording and upload it to a video portal; however, the attendees may not be aware that the meeting recording has been uploaded. In some cases, the host may manually send a notification to the attendees (if the attendee list is known).

However, generally, there may be no differentiation between the meeting recordings available to the attendees in proportion to their participation at the meeting. For example, neither the department head nor the secretary may be able to add metadata to the meeting recording. Alternatively, both the department head and the secretary may be able to add metadata to the meeting recording, although the secretary may not be interested in adding any metadata, and need not be provided the facility to manipulate the meeting recording. No mechanism exists for recording meetings and automatically notifying interested parties according to their respective perceived levels of interest.

Communication system 10 is configured to address these issues (and others) in offering a system and a method for distributing meeting recordings in a network environment. Embodiments of communication system can discover active participants 24 and passive participants 26 from meeting recording 20, generate an active notification comprising an option to manipulate the meeting recording, and a passive notification without the option to manipulate the meeting recording, and send the active notification and the passive notification to active participants 24 and passive participants 26, respectively. Followers 28 may also be discovered from meeting recording 20 and a followers notification may be generated and sent to followers 28. The followers notification may include permission to access a portion of meeting recording 20 (e.g., rather than whole meeting recording 20).

Embodiments of communication system 10 may use speaker segmentation and recognition (SSR) algorithms to detect speakers in the meeting recording. A portion of the SSR algorithm may match speakers found in the meeting recording with speakers discovered from previous meeting recordings. If the match is below a predetermined threshold, names of potential speakers may be suggested, for example, based on names corresponding to speaker models having the closest match. In some embodiments, active participants 24 may be contacted, as their names are made available (e.g., suggested) by SSR and meeting recording 20 may be sent to them. Active participants 24 may have privileges to confirm their names and contribute other types of metadata.

According to various embodiments, meeting recording distribution module 18 may detect names mentioned (audibly) in meeting recording 20 using existing algorithms (e.g., speech recognition, name entity extraction, etc.). For example, Lewis Carroll may say, "Let me talk to Alice about this." Alice may be correlated suitably with the speaker's name to obtain Alice Wonderland as the suggested spoken name. The portion of the meeting recording relevant to Alice Wonderland may be sent to Alice Wonderland by meeting recording distribution module 18. In some embodiments, participant information may also be obtained from invitee list 22. For example, WebEx shows the names of speakers on the display screen. The names may be detected and recognized using optical character recognition. Meeting recording distribution module 18 may send meeting recording 20 to the discovered speakers.

In some embodiments, attendees may be identified by voice or face recognition algorithms. For example, attendees who attended meeting 12, but did not speak may be suitably recognized. The video and face recognition algorithms typically make errors, which if left uncorrected, can propagate to analysis of other meeting recordings and generate more errors. According to embodiments of communication system 10, active participants 24 and passive participants 26 may be provided with an option to confirm their names and the names of other active participants 24. Once confirmed, active participants 24 can edit keywords, topics, and other metadata associated with them or their respective portions of meeting recording 20. Active participants 24 may have author or administrative privileges and can contribute more metadata, such as upload a presentation to meeting recording 20, modify a recommended video list, and so on. The metadata contributed by each active participant 24 can also be used to improve the speaker recognition for future videos.

Embodiments of communication system 10 may generate three mailing lists corresponding active participants 24, passive participants 26 and followers 28. When meeting recording 20 is made available, appropriate notifications (e.g., via email) may be automatically generated and sent to people listed in the three lists to inform of a meeting recording 20 being available for consumption (e.g., review, download, editing, etc.). In some embodiments, a first set of notifications may be sent after meeting recording 20 is processed; later notifications may be sent based on appropriate user interaction (e.g., when new speakers are added to metadata; etc.).

In one embodiment, the lists may be editable by host 14. Embodiments of communication system 10 can provide a push mechanism that first validates the conclusions of automatic analytics algorithms regarding who are participating in meeting 12 by asking "is this you?" or "do you know who this is?" type of questions to participants (e.g., active participants 24, passive participants 26) who are identified by the algorithms.

Embodiments of communication system 10 can automatically distribute uploaded meeting recording 20 to relevant people (e.g., active participants 24, passive participants 26 and followers 28). Consequently, video consumption may be increased, and may lead to enhanced viewer experience. Burden on host 14 to distribute meeting recording 20, add metadata, etc. may be reduced. Subscription models may be replaced with embodiments of communication system 10 to automatically link the participants and people referred to by the participants to a meeting recording. Embodiments of communication system 10 can also help improve SSR algorithm accuracy, for example, by confirming discovered speakers.

Turning to the infrastructure of communication system 10, meeting recording distribution module 18 may include suitable components for video/audio storage, video/audio processing, and information retrieval functionalities. Examples of such components include servers with repository services that store digital content, indexing services that allow searches, client/server systems, disks, image processing systems, etc. In some embodiments, components of meeting recording distribution module 18 may be located on a single network element; in other embodiments, components of meeting recording distribution module 18 may be located on more than one network element, dispersed across various networks. In some embodiments, meeting recording distribution module 18 may support multi-media content, enable link representation to local/external objects, support advanced search and retrieval, support annotation of existing information, etc. In other embodiments, meeting recording distribution module 18 may suitably interface with network elements that provide such functionalities.

According to embodiments of the present disclosure, elements of communication system 10 may represent a series of points or nodes of interconnected communication paths for receiving and transmitting packets of information, which propagate through system 10. A node may be any electronic device, user, server, peer, service, application, or other object capable of sending, receiving, or forwarding information over communications channels in a network. Elements of communication system 10 may include network elements (not shown) that offer a communicative interface between servers (and/or users) and may be any local area network (LAN), a wireless LAN (WLAN), a metropolitan area network (MAN), a virtual LAN (VLAN), a virtual private network (VPN), a wide area network (WAN), or any other appropriate architecture or system that facilitates communications in a network environment. In other embodiments, substantially all elements of communication system 10 may be located on one physical device (e.g., camera, server, media processing equipment, etc.) that is configured with appropriate interfaces and computing capabilities to perform the operations described herein.

Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs. Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable service nodes (physical or virtual) may be used to facilitate electronic communication between various service nodes in the network.

In various embodiments, content server 16 may include any suitable repository for storing media files, including web server, enterprise server, hard disk drives, camcorder storage devices, video cards, etc. Meeting recording 20 may be stored in any file format, including Moving Pictures Experts Group (MPEG), Apple Quick Time Movie (MOV), Windows Media Video (WMV), Real Media (RM), etc. Suitable file format conversion mechanisms, analog-to-digital conversions, etc.

and other elements to facilitate accessing media files may also be implemented in content server 16 within the broad scope of the present disclosure.

In various embodiments, elements of communication system 10 may be implemented as a stand-alone solution with associated databases for storing meeting recording 20. Communication system 10 may also be implemented in conjunction with processors and memory for executing instructions associated with the various elements (e.g., meeting recording distribution module 18, etc.). The different elements in communication system 10 may communicate with each other using application programming interfaces (APIs) and shared memory. Host 14 may access the stand-alone solution to initiate activities associated therewith. In other embodiments, elements of communication system 10 may be dispersed across various networks that can include any number of users, hosts, storage, servers, routers, gateways, and other nodes inter-connected to form a large and complex network.

The network environment may be configured over a physical infrastructure that may include one or more networks and, further, may be configured in any form including, but not limited to, LANs, WLANs, VLANs, MANs, WANs, VPNs, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

For example, content server 16 may be a web server located in an Internet cloud; and meeting recording distribution module 18 may be implemented on one or more enterprise servers. Myriad such implementation scenarios are possible within the broad scope of the embodiments. Embodiments of communication system 10 may leverage existing video repository systems (e.g., Cisco® Show and Share, YouTube, etc.), incorporate existing media/video tagging and speaker identification capability of existing devices (e.g., as provided in Cisco MXE3500 Media Experience Engine) and add features to allow users (e.g., active participants 24, passive participants 26 and followers 28) to receive notifications of meeting recording 20.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that the communication system 10 shown in FIG. 1 is simplified for ease of illustration.

Figure 2:
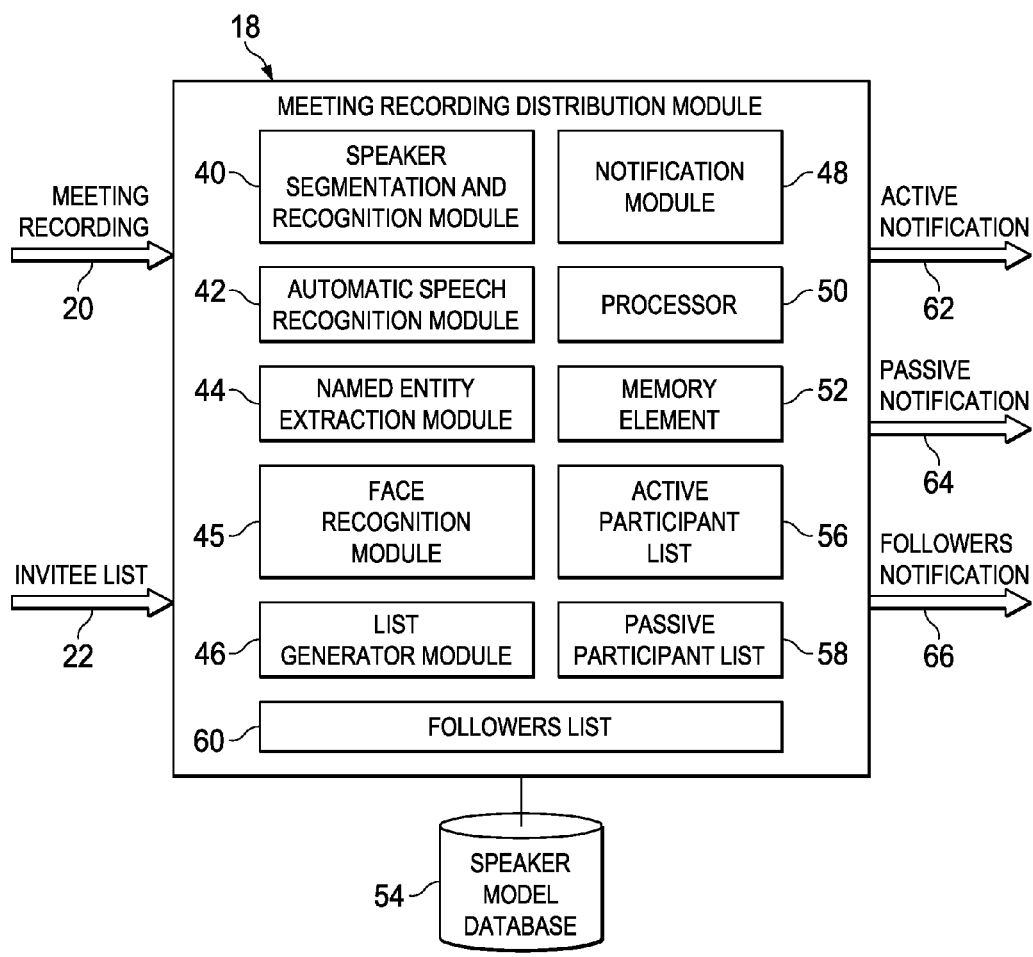
FIG. 2 is a simplified block diagram illustrating example details of an embodiment of the communication system.

Turning to FIG. 2, FIG. 2 is a simplified block diagram illustrating example details of communication system 10. Meeting recording distribution module 18 may include a speaker segmentation and recognition module 40, an automatic speech recognition module 42, a named entity extraction module 44, a face recognition module 45, a list generator module 46, a notification module 48, a processor 50, and a memory element 52. Meeting recording distribution module 18 may access a speaker model database 54, which may include various speaker models of speakers from meeting recordings recorded previously.

Meeting recording 20 may be received at meeting recording distribution module 18, and SSR module 40 may run SSR algorithms thereon. SSR module 40 may discover some speakers in meeting recording 20. SSR module 40 may access speaker model database 54 and compare the discovered speakers with speaker models in speaker model database 54. SSR algorithms may be run until reasonable confidence in discovered speakers is achieved. Automatic speech recognition module 42 may run automatic speech recognition algorithms to discover spoken words in meeting recording 20. Named entity extraction module 44 may analyze the spoken words and extract any spoken names therefrom.

In some embodiments, face recognition module 45 may also analyze meeting recording 20 and identify attendees at meeting 12, including active participants 24 and passive participants 26. In various embodiments, speaker segmentation and recognition module 40, automatic speech recognition module 42, named entity extraction module 44, face recognition module 45 may refer invitee list 22 to compare discovered attendees with the invitees. For example, all invitees may not attend the meeting; alternatively (or additionally), some uninvited guests may attend the meeting. Comparing the discovered speakers and attendees to invitee list 22 may facilitate improving the accuracy of the algorithms, and to generate appropriate lists of attendees. List generator module 46 may generate an active participant list 56, comprising names of active participants 24; a passive participants list 58 comprising names of passive participants 26; and a followers list 60, comprising names of followers 28.

Notification module 48 may generate appropriate notifications, including an active notification 62, targeted to active participants 24 listed in active participant list 56; a passive notification 64, targeted to passive participants 26 listed in passive participant list 58; and a followers notification 66, targeted to followers 28 listed in followers list 60. As used herein, the term "notification" can include any notice, announcement, message (e.g., e-mail, phone message, text message, etc.), publication, broadcast, note, letter, etc. Such a notification could, for example, serve to inform the recipient and/or request information from the recipient. Active notification 62 may include a notification of meeting recording 20, including links to access meeting recording 20, mechanisms to manipulate meeting recording 20 (e.g., add metadata, attach presentation, etc.), and mechanisms to confirm the name (e.g., facilities to answer questions such as "is your name X," etc.). Passive notification 64 may include a notification of meeting recording 20, without option to manipulate. In some embodiments, passive notification 64 may include an option to confirm the attendee's name.

Followers notification 66 may include notification of meeting recording 20. In some embodiments, followers notification 66 may include permission to access only a relevant portion of meeting recording 20 (e.g., portions where followers 28 were mentioned). In other embodiments, followers notification 66 may include permission to access the whole meeting recording 20. In yet other embodiments, followers notification 66 may be first sent to host 14, to request permission to notify followers 28. Host 14 may be provided a choice of permitting one, more, all or none of followers 28 to access meeting recording 20. In other embodiments, all speakers may be sent followers notification 66, with a choice to permit one, more, all or none of followers 28 to access meeting recording 20. In yet other embodiments, the particular speaker who mentioned a specific follower's name may be sent followers notification 66, with a choice to permit the specific follower to access meeting recording 20. Various such mechanisms may be possible and are included within the broad scope of the embodiments.

In one embodiment, notifications including active notification 62, passive notification 64 and followers notification 66 may be formatted as an email, with hyperlinks to meeting recording 20, and options to manipulate, confirm, etc. provided in the body of the email. In another embodiment, active notification 62, passive notification 64 and followers notification 66 may be formatted as a text message, with a hyperlink to a webpage or another central location from where meeting recording 20 can be accessed and suitably manipulated, confirmations entered, and so on. In yet another embodiment, active notification 62, passive notification 64 and followers notification 66 may be formatted as voice messages, informing of the location at which meeting recording 20 may be accessed and suitably manipulated, etc., with confirmation options provided according to touch-tone entries on the phone (e.g., "press 1 if you spoke at the meeting," etc.).

In some embodiments, active notification 62, passive notification 64 and followers notification 66 may be sent as at least two messages: the first message including a confirmatory request (e.g., "please confirm that you spoke at the meeting;" "please confirm that your name is X;" etc.) and a follow-up message with meeting recording 20 (or link to meeting recording 20) if the confirmation is affirmative. In yet other embodiments, active notification 62, passive notification 64 and followers notification 66 may include a link to a web server or other central repository, and a confirmation page (or suitable display) may be presented to the viewer to confirm his or her participation, name, etc. Based on the confirmation status, the viewer may be provided access to meeting recording 20, or portions thereof. Various such notification mechanisms are possible and included within the broad scope of the embodiments.

Figure 3:
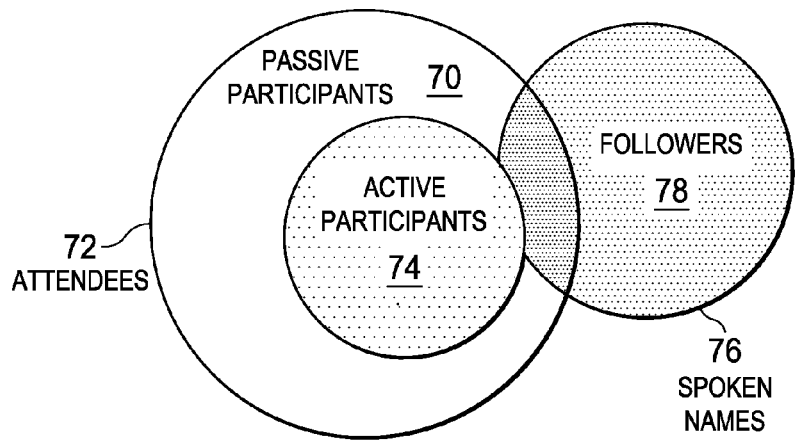
FIG. 3 is a simplified diagram illustrating other example details of an embodiment of the communication system.

Turning to FIG. 3, FIG. 3 is a simplified diagram illustrating example sets of people relevant to embodiments of communication system 10. Attendees set 70 may include passive participants set 72 and active participants set 74. In set notation, attendees set 70 may be denoted as A, passive participants set 72 may be denoted as P and active participants set 74 may be denoted as S:

$$P \cup S = A$$

If all attendees spoke, then P would be a null set {Ø}. Spoken names set 76 may include followers set 78 and a subset of attendees set 70. For example, the names of attendees may be mentioned at the meeting, in addition to names of people (e.g., followers 28) who did not attend the meeting. In set notation, spoken names set 76 may be denoted as B, and followers set 78 may be denoted as F:

$$F = S \setminus A$$

If all spoken names correspond to attendees, then F would be a null set {Ø}, and S would be a subset of A.

Figure 4:
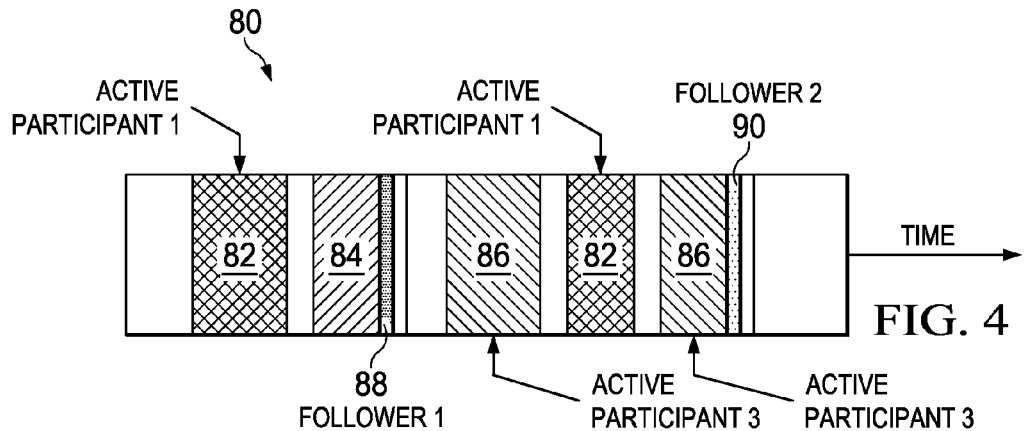
FIG. 4 is a simplified flow diagram illustrating example operations that may be associated with embodiments of the communication system.

Turning to FIG. 4, FIG. 4 is a simplified diagram illustrating a representation of video showing time points associated with speakers and other features according to embodiments of communication system 10. Video representation 80 denotes a strip of video progressing horizontally in time. Shaded portions represent video segments associated with features such as speakers, and spoken names. For example, active participant 1 may be represented as strip 82 and may be associated with video segments corresponding to when active participant 1 spoke in the specific video. Similarly, active participant 2 may be represented as strip 84, and may be associated with a video segment corresponding to when active participant 2 spoke in the specific video. Active participant 3 may be represented as strip 86, and may be associated with video segments corresponding to when active participant 3 spoke in the specific video. Follower 1 may be mentioned by active participant 2, and may be represented as strip 88, overlapping with strip 84, corresponding to active participant 2. Follower 2 may be mentioned by active participant 3, and may be represented as strip 90, overlapping with strip 86, corresponding to active participant 3.

In some embodiments, video representation 80 may be provided on a display portal displaying the video. The viewer may be able to click on any one of the strips and the video display may switch to a video segment corresponding to the selected strip. In some embodiments, the displayed strips may correspond to a selected speaker name or follower name. For example, the viewer may be able to select a speaker name or follower name from a list of speaker names and follower names on the display portal. Video representation 80 may thereafter display only those strips corresponding to the selected name. In other embodiments, the displayed strips may correspond to few or substantially all speaker names and follower names in the video.

In many embodiments, the strips may be represented as colored lines, with distinct colors corresponding to different features. For example, in one example embodiment, each speaker may be associated with a separate color, and the displayed strips may indicate the speaker by the associated color. In another example embodiment, speakers may be indicated by one color (or set of colors) and followers may be indicated by another color (or another set of colors). Various such configurations are possible within the broad scope of the embodiments.

Figure 5:
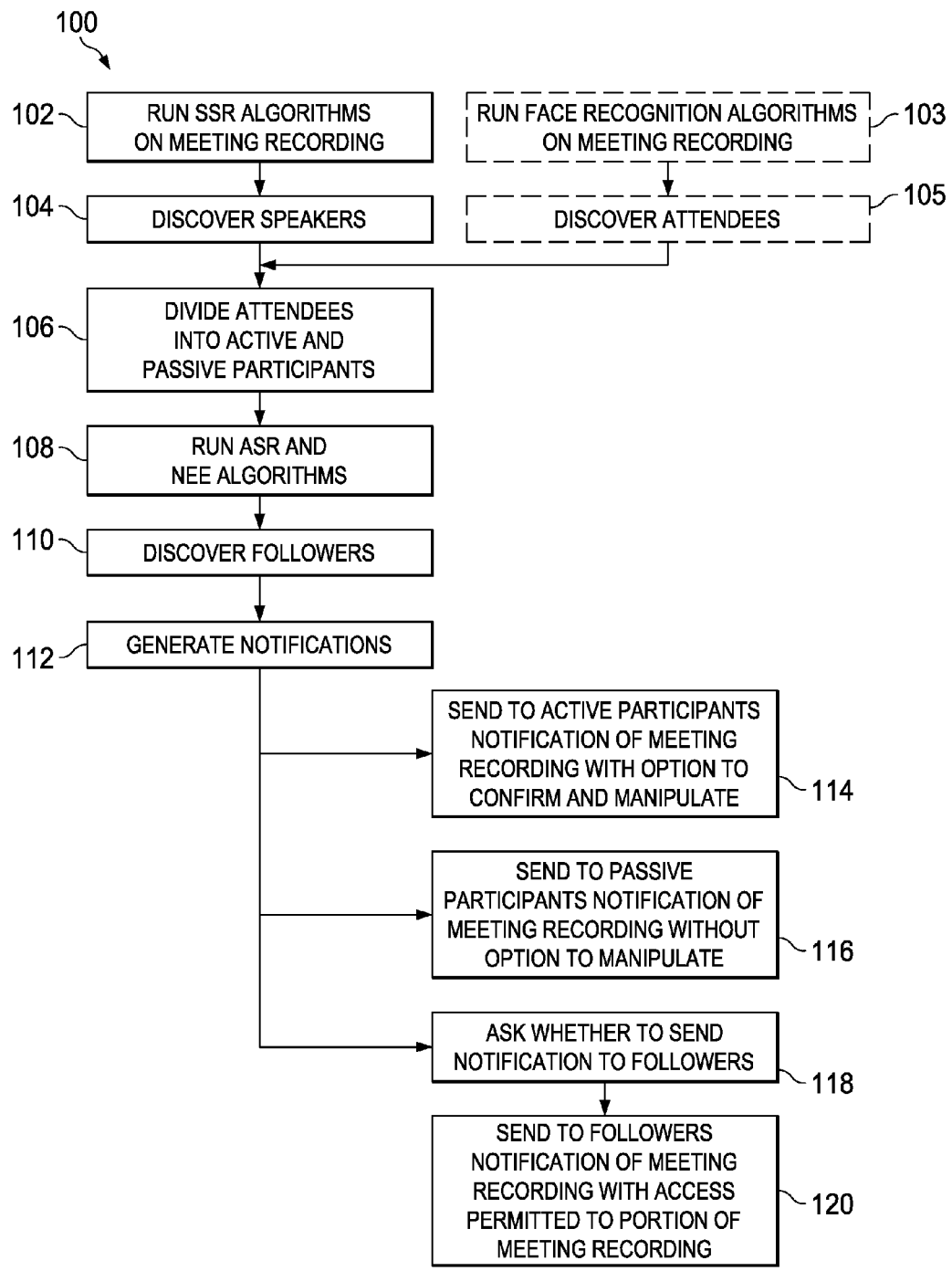
FIG. 5 is a simplified flow diagram illustrating other example activities that may be associated with embodiments of the communication system.

Turning to FIG. 5, FIG. 5 is a simplified flow diagram illustrating example operations 100 that may be associated with embodiments of communication system 10. Operations 100 may include 102, at which SSR algorithms may be run on meeting recording 20. In some embodiments, at 103, face recognition algorithms may be run on meeting recording 20 (e.g., if meeting recording 20 includes a video of the meeting). At 104, speakers may be discovered by the SSR algorithms. At 105, in some embodiments, attendees may be discovered at 105. The discovered attendees may correspond to a portion of the total attendees in some scenarios. For example, meeting recording 20 may include video of a few attendees. In other scenarios, the discovered attendees may correspond to substantially all attendees.

At 106, attendees may be divided into active participants 24 and passive participants 26 depending on the discovered speakers at 104. In some embodiments, the discovered attendees (e.g., at 105) may be compared with invitee list 22 to determine if any non-invitees attended, or if some invitees did not attend. In any case, the total attendees discovered from SSR and other algorithms, estimated from invitee list 22, or otherwise determined, may be used to estimate active participants 24 and passive participants 26. At 108, ASR and NEE algorithms may be run on meeting recording 20. At 110, followers 28 may be discovered. At 112, notifications (e.g., active notifications 62, passive notifications 64 and followers notification 66) may be generated.

At 114, active notifications 62 (including notification of meeting recording 20 with option to confirm and manipulate) may be sent to active participants 24. At 116, passive notifications 64 (including notification of meeting recording 20 without option to manipulate) may be sent to passive participants 26. At 118, host 14, and/or relevant active participants 24 may be asked whether followers notification 66 may be sent to followers 28. If the response is affirmative, followers notification 66 (including access permitted to relevant portion of meeting recording 20) may be sent to followers 28 at 120.

Figure 6:
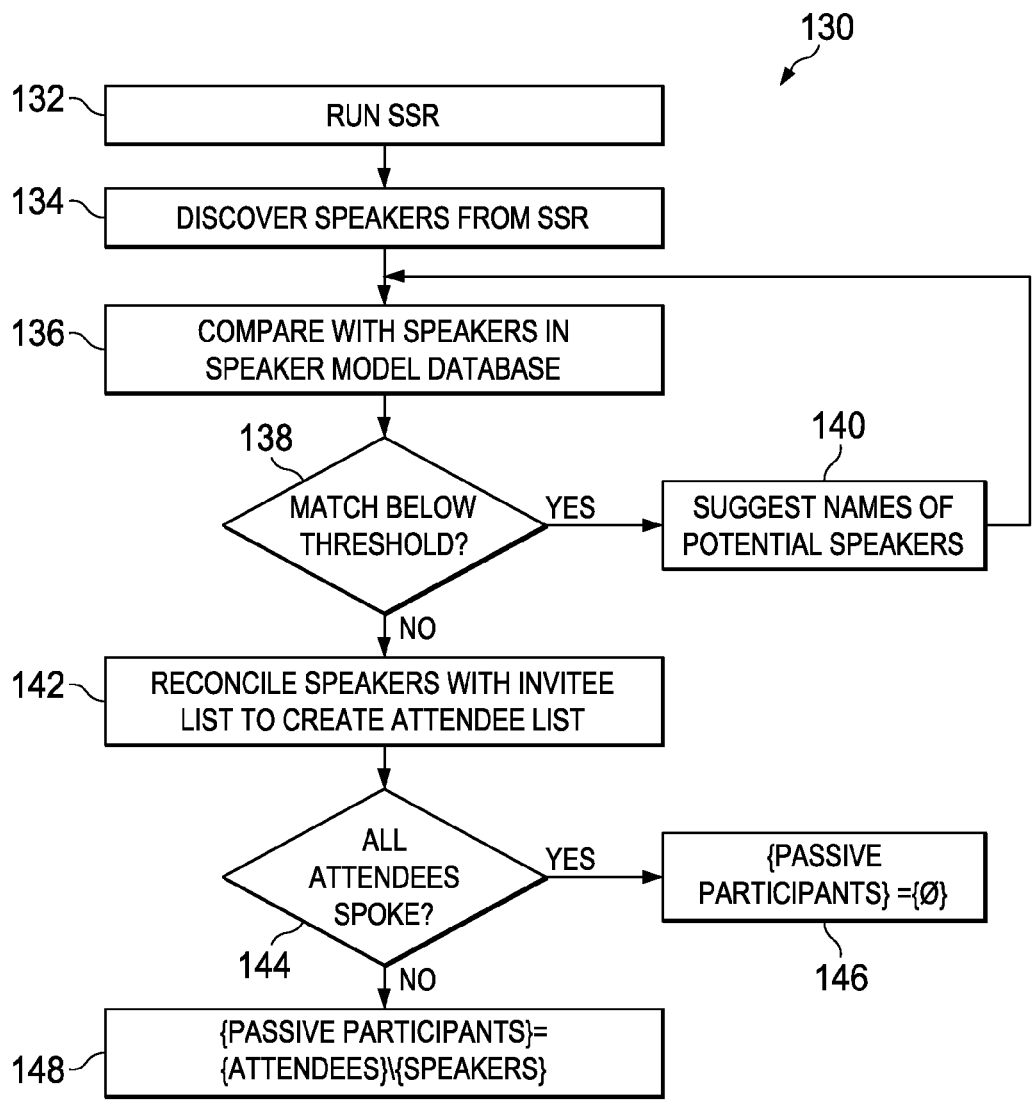
FIG. 6 is a simplified flow diagram illustrating yet other example activities that may be associated with embodiments of the communication system.

Turning to FIG. 6, FIG. 6 is a simplified flow diagram illustrating example operations 130 to generate active participant list 56 and passive participant list 58 according to embodiments of communication system 10. At 132, SSR algorithms may be run on meeting recording 20. At 134, speakers may be discovered from SSR. At 136, discovered speakers may be compared with speakers in speaker model database 54. At 138, a determination may be made whether the match between the discovered speaker and corresponding model in speaker model database 54 is below a certain (predefined) threshold. If the match is below the threshold, names of potential speakers may be suggested at 140. For example, names having the closest match may be suggested. In another example, names corresponding to speaker models having the closest match may be suggested.

If the match is not below the threshold at 138 (e.g., indicating that the discovered speaker may correspond to a speaker model in speaker model database 54), the discovered speakers may be reconciled with invitee list 22 to create an attendee list (which may include invitees and non-invitees who spoke at the meeting). As used herein, the term "reconcile" can include comparing and merging, resolving, combining or otherwise uniting elements of two or more lists. At 144, a determination may be made whether all attendees spoke. If all attendees spoke, passive participant set 72 would be null set {Ø} at 146. Otherwise, at 148, passive participant set 72 would be computed as the attendees who are not included among the speakers (e.g., passive participant set 72 would be the members of attendee set 70 left over after removing members of active participant set 74).

Figure 7:
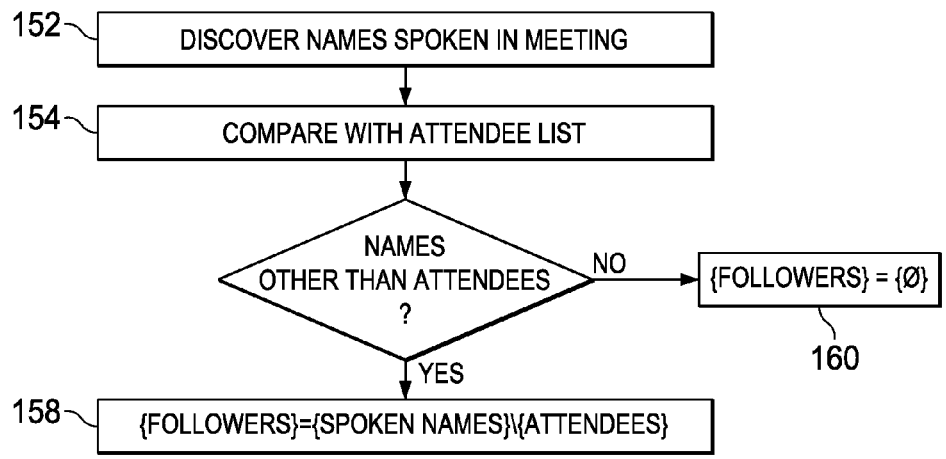
FIG. 7 is a simplified flow diagram illustrating yet other example activities that may be associated with embodiments of the communication system.

Turning to FIG. 7, FIG. 7 is a simplified flow diagram illustrating example operations 150 that may be associated with generating followers list 60 according to an embodiment of communication system 10. At 152, names spoken in meeting 12 may be discovered (e.g., by running ASR and NEE algorithms on meeting recording 20). At 154, the spoken names may be compared with the attendee list. At 156, a determination may be made whether the spoken names include names other than attendees. If affirmative, followers set 78 may be determined as the spoken names left over after removing the attendees (e.g., {followers}={spoken names}\{attendees}). If the spoken names do not include names other than attendees, followers set 78 may be null set {Ø}.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

In example implementations, at least some portions of the activities outlined herein may be implemented in software in, for example, meeting recording distribution module 18. In some embodiments, one or more of these features may be implemented in hardware, provided external to these elements, or consolidated in any appropriate manner to achieve the intended functionality. The various network elements may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, meeting recording distribution module 18 described and shown herein (and/or its associated structures) may also include suitable interfaces for receiving, transmitting, and/or otherwise communicating data or information in a network environment. Additionally, some of the processors and memory elements associated with the various service nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 52) can store data used for the operations described herein. This includes the memory element being able to store instructions (e.g., software, logic, code, etc.) in non-transitory computer readable media such that the instructions are executed to carry out the activities described in this Specification. A processor can execute any type of instructions associated with the data to achieve the operations detailed herein in this Specification. In one example, processors (e.g., processor 50) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in communication system 10 can include one or more memory elements (e.g., memory element 52, speaker model database 54) for storing information to be used in achieving operations as outlined herein. These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    discovering from a meeting recording, by a meeting recording distribution module, active participants and passive participants of a meeting;
    generating an active notification comprising an option to manipulate the meeting recording, and a passive notification without the option to manipulate the meeting recording, wherein the manipulating comprises adding content, including metadata, to the meeting recording; and
    sending the active notification and the passive notification to the active participants and the passive participants, respectively.

2. The method of claim 1, further comprising:
    discovering followers from the meeting recording;
    generating a followers notification without the option to manipulate the meeting recording, and comprising access to a portion of meeting recording; and
    sending the followers notification to the followers.

3. The method of claim 2, wherein the discovering the followers comprises:
    running automatic speech recognition and named entity extraction algorithms on the meeting recording;
    discovering spoken names in the meeting recording; and
    associating the followers with a portion of the spoken names not corresponding to attendees in the meeting recording.

4. The method of claim 2, wherein the followers notification is sent after obtaining a permission from at least one of a host and a portion of the active participants.

5. The method of claim 4, wherein the portion of the active participants corresponds to active participants who mentioned the followers in the meeting recording.

6. The method of claim 1, wherein the active notification and the passive notification include a provision to access and view the meeting recording.

7. The method of claim 1, wherein the discovering the active participants and the passive participants comprises:
    running speaker segmentation and recognition algorithms on the meeting recording;
    discovering attendees including speakers and non-speakers; and
    categorizing the speakers as the active participants, and the non-speakers as the passive participants.

8. The method of claim 7, wherein discovering the attendees comprises running face recognition algorithms on the meeting recording.

9. The method of claim 7, further comprising:
    comparing the discovered speakers to speaker models from pre-recording videos; and
    suggesting names of potential speakers if a match between the discovered speakers and the speaker models is below a predetermined threshold.

10. The method of claim 9, further comprising:
    reconciling the discovered speakers with an invitee list to generate an attendee list;
    determining if substantially all attendees in the attendee list spoke in the meeting recording; and
    determining the passive participants as those attendees who did not speak.

11. Non-transitory media encoding logic, which includes instructions for execution and when executed by a processor, is operable to perform operations comprising:
    discovering from a meeting recording, active participants and passive participants of a meeting;
    generating an active notification comprising an option to manipulate the meeting recording, and a passive notification without the option to manipulate the meeting recording, wherein the manipulating comprises adding content, including metadata, to the meeting recording; and
    sending the active notification and the passive notification to the active participants and the passive participants, respectively.

12. The media of claim 11, the operations further comprising:
    discovering followers from the meeting recording;
    generating a followers notification without the option to manipulate the meeting recording, and comprising access to a portion of meeting recording; and
    sending the followers notification to the followers.

13. The media of claim 12, wherein the discovering the followers comprises:
    running automatic speech recognition and named entity extraction algorithms on the meeting recording;

discovering spoken names in the meeting recording; and associating the followers with a portion of the spoken names not corresponding to attendees in the meeting recording.

14. The media of claim 11, wherein the discovering the active participants and the passive participants comprises:

running speaker segmentation and recognition algorithms on the meeting recording;

discovering attendees including speakers and non-speakers; and categorizing the speakers as the active participants, and the non-speakers as the passive participants.

15. The media of claim 14, the operations further comprising:

comparing the discovered speakers to speaker models from pre-recording videos; and suggesting names of potential speakers if a match between the discovered speakers and the speaker models is below a predetermined threshold.

16. An apparatus, comprising:

a speaker segmentation and recognition module;

a memory element for storing data; and a processor that executes instructions associated with the data, wherein the processor and the memory element cooperate such that the apparatus is configured for:

discovering from a meeting recording, active participants and passive participants of a meeting;

generating an active notification comprising an option to manipulate the meeting recording, and a passive notification without the option to manipulate the meeting recording, wherein the manipulating comprises adding content, including metadata, to the meeting recording; and sending the active notification and the passive notification to the active participants and the passive participants, respectively.

17. The apparatus of claim 16, further comprising:

an automatic speech recognition module; and a named entity extraction module, the apparatus being further configured for:

discovering followers from the meeting recording;

generating a followers notification without the option to manipulate the meeting recording, and comprising access to a portion of meeting recording; and sending the followers notification to the followers.

18. The apparatus of claim 17, wherein the discovering the followers comprises:

running automatic speech recognition and named entity extraction algorithms on the meeting recording;

discovering spoken names in the meeting recording; and associating the followers with a portion of the spoken names not corresponding to attendees in the meeting recording.

19. The apparatus of claim 16, wherein the discovering the active participants and the passive participants comprises:

running speaker segmentation and recognition algorithms on the meeting recording;

discovering attendees including speakers and non-speakers; and categorizing the speakers as the active participants, and the non-speakers as the passive participants.

20. The apparatus of claim 19, the operations further comprising:

comparing the discovered speakers to speaker models from pre-recording videos; and suggesting names of potential speakers if a match between the discovered speakers and the speaker models is below a predetermined threshold.

* * * * *